UNITED STATES PATENT OFFICE.

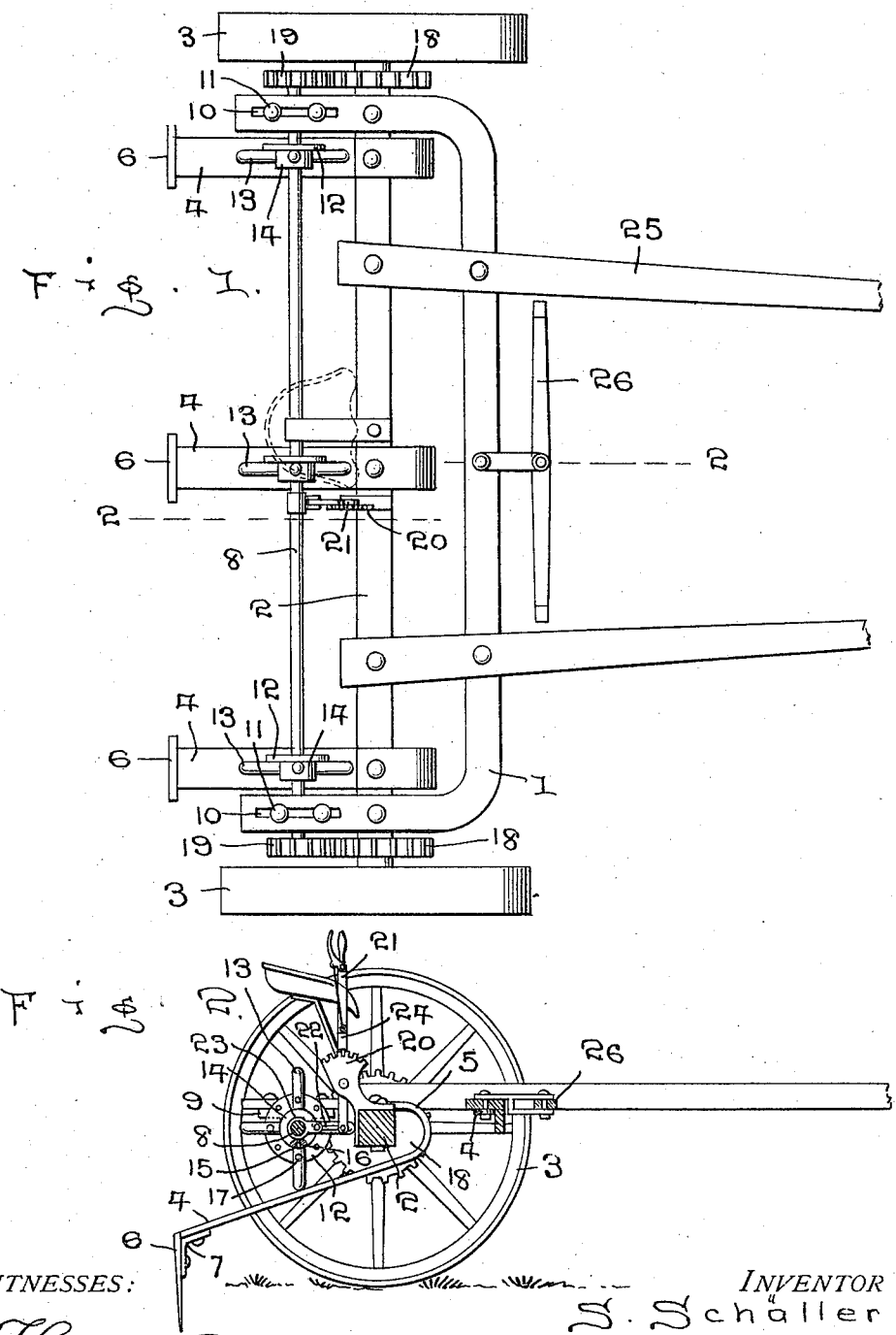

SIGMUND SCHÄLLER, OF HADDAM, CONNECTICUT.

COMBINATION CULTIVATOR AND FURROW-MAKER.

965,411.  Specification of Letters Patent.  Patented July 26, 1910.

Application filed March 24, 1910. Serial No. 551,254.

*To all whom it may concern:*

Be it known that I, SIGMUND SCHÄLLER, a citizen of the United States, residing at Haddam, in the county of Middlesex and State of Connecticut, have invented certain new and useful Improvements in Combination Cultivators and Furrow-Makers; and I do hereby declare the following to be a full, clear, and exact description of the invention, such as will enable others skilled in the art to which it appertains to make and use the same.

My invention relates to new and useful improvements in combination cultivators and furrow makers and my object is to provide suitable shovels and arrange the same, whereby a chopping action will be had when desired to pulverize the soil.

A further object is to mount said shovels upon spring shanks, whereby the shovels will be normally elevated out of engagement with the earth's surface.

A further object is to provide means for intermittently lowering the shovels and spring shanks.

A further object is to provide means for increasing or decreasing the rapidity with which the shovels are lowered, and, a further object is to provide means for disengaging the shovel lowering means from its source of power.

Other objects and advantages will be hereinafter referred to and more particularly pointed out in the specification and claims.

In the accompanying drawings which are made a part of this application, Figure 1 is a top plan view of the device, and, Fig. 2 is a transverse sectional view as seen on line 2—2 Fig. 1.

Referring to the drawings in which similar reference numerals designate corresponding parts throughout the several views, 1 indicates a frame, which is preferably constructed of angle iron and 2 indicates an axle upon which the frame rests, wheels 3 being mounted upon the ends of the axle.

Attached to the axle 2 are shanks 4, which are preferably formed of spring metal and have their forward ends curved upwardly and rearwardly, as shown at 5, thus disposing the front end of the shanks in such position as to extend over and engage the upper face of the axle, while the body of the shank extends horizontally below the axle and rearwardly therefrom.

Attached to the rear end of the shanks 4 are shovels 6, which shovels may be constructed in any preferred manner and preferably pointed, whereby they will readily enter the soil when lowered, said shovels being preferably fixed to the shanks by means of straps 7, although it will be understood that said shovels can be attached in any preferred manner.

In order to lower the shanks 4 and enter the shovels 6 into the ground, I provide a shaft 8 in the rear of the axle 2 and support the same through suitable bearings 9 carried by the ends of the frame 1, said ends of the frame having elongated slots 10 therein, through which are extended bolts 11 employed for holding the bearings in position and by providing said slots, the shaft 8 may be moved laterally when desired.

Attached to the shaft 8 and adapted to rotate therewith are disks 12 which are equal in number to the number of shanks 4 and to said disks are removably attached pins 13, which pins are adapted to engage the upper faces of the shanks and force the shanks and shovels downwardly when the shaft 8 is rotated. Each disk is provided with a hub 14, in which are provided sockets 15 and into said sockets are entered the stems 16 of the pins 13, while bolts 17 or similar devices are extended through the pins and the disks at a point above the hub, thereby securely locking the pins into engagement with the disks and at the same time removably securing the pins to the disks. Any number of the pins may be attached to the disks, but when the device is being used for making furrows or openings for the reception of grain, the distance between said openings may be readily regulated by increasing or decreasing the number of pins on the disks.

If it is desired to pulverize the soil, the full number of pins are attached to each disk, when the shovels will be rapidly lowered, thereby giving a chopping action to the shovels, which will result in thoroughly pulverizing the soil in line with the shovels.

The shaft 8 is rotated by attaching to the hubs of the wheels cogs 18, with which mesh gears 19 on the ends of the shaft 8 and by providing gears of various sizes, the shaft 8 may be driven at various speeds. To stop the rotation of the shaft 8, as when the device is being moved from place to place, said shaft is moved laterally and the gears on the ends thereof disengaged from the cogs on the wheels, this operation being readily accomplished by placing a rack bar 20 on the axle 2 and pivotally attaching thereto a lever 21, the lower end of which lever has attached thereto a link 22, which link is in turn engaged with a collar 23 on the shaft 8 and it will be readily seen that when the lever is thrown back and forth, the gears 19 will be engaged with or disengaged from the cogs on the driving wheels. The lever 21 is held in its adjusted position by providing a spring operated latch 24, which coöperates with the teeth on the rack bar 20 to hold the lever in its adjusted position.

It will be understood that any number of shanks and shovels may be attached to the axle, but in the present instance, I have shown but three, whereby three rows of openings may be formed in which to plant the grain at the same time. When the machine is drawn by a single animal, a pair of shafts 25 is attached to the frame and axle and a swingle tree 26 positioned between the shafts to which the animal is attached. Instead, however, of operating the device with one animal, two or more animals may be hitched thereto by providing a tongue and the necessary swingle trees.

This device can also be used in covering grain after it has been dropped into the openings formed for that purpose, from the fact that said openings are spaced a predetermined distance apart, the operation of the shovels can be so timed as to be moved into the soil just before reaching the openings, the forward movement of the implement causing the shovels to throw the soil engaged thereby forwardly a sufficient distance to cover the grain deposited in the openings.

What I claim is:—

1. In a cultivating device, the combination with a frame and supporting means therefor, of shanks having one of their ends stationary, a rotatable and movable shaft on said frame, hubs having disks at one end mounted upon said shaft, said hubs having sockets therein, pins adapted to depress said shanks, said pins having stems thereon adapted to enter said sockets and means to removably secure the pins to the disks.

2. In a cultivating device, the combination with an axle, a frame carried by said axle, supporting wheels mounted on the axle and cogs carried by said wheels, of a shaft rotatably and slidably mounted on said frame, gears at the ends of said shaft adapted to mesh with the cogs on the wheels, means to move the shaft and dispose the gears into or out of engagement with the cogs, disks carried by the shaft, pins removably secured to said disks and resilient shanks carried by the axle adapted to be engaged and lowered by said pins.

3. In a cultivating device, the combination with an axle, a frame attached thereto and wheels at the ends of said axle, of resilient shanks having one of their ends attached to the axle and extending below and rearwardly therefrom, shovels on the ends of said shanks, a shaft slidably mounted on the frame, disks carried by said shaft, pins removably attached to said disks adapted to engage and lower the free ends of the shanks and means to rotate said shaft.

4. A cultivating device, comprising the combination with an axle, a frame carried thereby and supporting wheels for the ends of the axle, shanks carried by the axle, shovels carried by the shanks, a shaft movably mounted on said frame, means connecting with said wheels to rotate the shaft, disks mounted on the shaft, pins removably secured to said disks and adapted to lower the shanks and shovels thereon intermittently and means to move said shaft out of engagement with its rotating means.

5. In a cultivating device, the combination with shanks having one of their ends stationary, of hubs having disks thereon, pins removably secured to the disks and hubs and means to rotate said disks, whereby the pins will force the free ends of the shanks downwardly.

In testimony whereof I have signed my name to this specification in the presence of two subscribing witnesses.

SIGMUND SCHÄLLER.

Witnesses:
    BEN. KELSEY,
    GEORGE A. DICKINSON.